United States Patent
Yoshida

(10) Patent No.: US 10,934,413 B2
(45) Date of Patent: Mar. 2, 2021

(54) LIQUID STABILIZER FOR CHLORINE-CONTAINING RESIN AND APPLICATION OF THE LIQUID STABILIZER

(71) Applicant: Sakai Chemical Industry Co., Ltd., Sakai (JP)

(72) Inventor: Yuji Yoshida, Tokyo (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 62 days.

(21) Appl. No.: 16/464,187

(22) PCT Filed: Nov. 24, 2017

(86) PCT No.: PCT/JP2017/042137
§ 371 (c)(1),
(2) Date: May 24, 2019

(87) PCT Pub. No.: WO2018/097217
PCT Pub. Date: May 31, 2018

(65) Prior Publication Data
US 2020/0291203 A1    Sep. 17, 2020

(30) Foreign Application Priority Data

Nov. 28, 2016 (JP) .............................. JP2016-230504

(51) Int. Cl.
*C08K 5/098* (2006.01)
*C08L 27/06* (2006.01)
*C08L 27/08* (2006.01)
*C08K 5/00* (2006.01)

(52) U.S. Cl.
CPC .............. *C08K 5/098* (2013.01); *C08L 27/06* (2013.01); *C08L 27/08* (2013.01); *C08K 5/0016* (2013.01); *C08L 2201/10* (2013.01)

(58) Field of Classification Search
CPC ....... C08K 5/098; C08K 5/0016; C08L 27/08; C08L 27/06
USPC .......................................................... 524/394
See application file for complete search history.

(56) References Cited

U.S. PATENT DOCUMENTS 5,147,917 A * 9/1992 Sugawara ................ C08K 3/26
524/357

FOREIGN PATENT DOCUMENTS

| JP | 3-265645 | 11/1991 |
| JP | 4-136054 | 5/1992 |
| JP | 4-216845 | 8/1992 |
| JP | 5-140393 | 6/1993 |
| JP | 8-120109 | 5/1996 |
| JP | 08120109 | * 5/1996 |
| JP | 9-208776 | 8/1997 |
| JP | 9-208777 | 8/1997 |
| JP | 11-060746 | 3/1999 |
| JP | 2000-001587 | 1/2000 |
| JP | 2006-036896 | 2/2006 |
| JP | 2007-204525 | 8/2007 |
| JP | 2007-321117 | 12/2007 |
| WO | 2018/155201 | 8/2018 |

OTHER PUBLICATIONS

Translation of JP 08120109, May 14, 1996. (Year: 1996).*
Database CA [Online], Chemical Abstracts Service, Columbus, Ohio, US; Toshihiro, et al., "Chlorine-containing resin composition and molded article using same", XP002798171 retrieved from STN Database accession No. 2018:1642244—Abstract.
Database CA [Online], Chemical Abstracts Service, Columbus, Ohio, US; Shiichi, Ichiro et al., "Discloeration-reduced vinyl chloride polymer compositions containing calcium carbonate", XP002798173, retrieved from STN Database accession No. 1993:40204—Abstract.

* cited by examiner

*Primary Examiner* — Hui H Chin
(74) *Attorney, Agent, or Firm* — Hamre, Schumann Mueller & Larson, P.C.

(57) ABSTRACT

The present invention provides a liquid stabilizer that can provide a formed article excellent in both of transparency and heat resistance, and that is useful as a tin-free stabilizer. The present invention also provides a chlorine-containing resin composition using this stabilizer and a formed body using this stabilizer. The present invention is a liquid stabilizer for a chlorine-containing resin, comprising a zinc toluate and an overbased barium salt, wherein the content of the zinc toluate and the content of the overbased barium salt are 1 to 50% by mass and 50 to 99% by mass, respectively, based on a total amount of the zinc toluate and the overbased barium salt of 100% by mass.

7 Claims, 2 Drawing Sheets

FIG.1

| Geer oven 200°C | Original piece | 10min | 20min | 30min | 40min | 50min | 60min | 70min | 80min |
|---|---|---|---|---|---|---|---|---|---|
| (a) | | | | | | | | | |
| (b) | | | | | | | | | |
| (c) | | | | | | | | | |

# LIQUID STABILIZER FOR CHLORINE-CONTAINING RESIN AND APPLICATION OF THE LIQUID STABILIZER

TECHNICAL FIELD

The present invention relates to a liquid stabilizer for a chlorine-containing resin and an application of the liquid stabilizer. In particular, the present invention relates to a liquid stabilizer for a chlorine-containing resin, and, a chlorine-containing resin composition and formed body using the liquid stabilizer.

BACKGROUND ART

Chlorine-containing resins typified by polyvinyl chloride have high flexibility and are easy to be processed, and for this reason, are conventionally used in a wide range of films, electrical wires, pipes, resin window frames and the like, and in addition, are used in various applications such as construction materials, automobile parts and household electrical appliance parts. However, chlorine-containing resins have a problem with thermal stability, and due to the fact that the chlorine-containing resins are unstable to heat generated during the processing or use, result in the decomposition by heating, and for this reason, a stabilizer is typically used.

For, for example, a formed article (also referred to as a molded article) required to be transparent, in particular with regard to the formulation of the formed article using a plasticizer in a small amount and demanding heat resistance during processing, a tin stabilizer is typically used as a stabilizer. The reason of this is because a resin composition comprising a tin stabilizer and a chlorine-containing resin has high heat resistance, and therefore can be processed under harsh molding conditions to obtain a formed article having very high transparency. However, the use of a tin compound tends to be avoided in view of raising consciousness on environmental problems in recent years, and also in technical fields in which a tin stabilizer is currently used, there is a demand for a tin-free stabilizer.

As specific examples of the conventional stabilizer, a liquid stabilizer for a chlorine-containing resin, comprising a zinc toluate, barium toluate and an alkyl hydrogen phosphite (see Patent Literature 1) is disclosed, and in addition, a liquid stabilizer composition for a vinyl chloride resin, comprising an organic acid zinc salt, and a liquid overbased alkaline earth metal complex (see Patent Literature 2) is disclosed.

CITATION LIST

Patent Literature

Patent Literature 1: JP 2006-36896 A
Patent Literature 2: JP 2007-204525 A

SUMMARY OF INVENTION

Technical Problem

As described above, there has been a demand for a tin-free stabilizer in recent years; however, in the current situation, no tin-free stabilizer has been developed which is equivalent to a tin stabilizer in terms of the performance. Examples of known stabilizers include a barium zinc type stabilizer (Ba/Zn type stabilizer) and a calcium zinc type stabilizer (Ca/Zn type stabilizer); however, the use of these known stabilizers in a chlorine-containing resin does not result in sufficient heat resistance, and as a result of this, it is not possible to conduct the processing under harsh molding conditions. Also, an overbased barium salt is known to be a heat resistant stabilizer; however, the overbased barium salt has a problem in terms of transparency and color tone. In such a case where the conventional stabilizer is used in chlorine-containing resin, even if the heat resistance of the resin composition can be improved, the transparency and color tone tend to be impaired substantially, and by contrast to this, the heat resistance decreases substantially when the transparency and the color tone are improved, and therefore, the formed article has not been able to satisfy both of high transparency and high heat resistance.

The stabilizer described in Patent Literature 1 has a problem in that the stabilizer has particularly poor heat resistance. Also, as described in the paragraph [0071] of Patent Literature 2, the stabilizer composition described in Patent Literature 2 is suitable for an application of interior decorative materials such as wall paper or floor, but in these applications, the transparency is not demanded typically. For this reason, it can be deemed that the challenge of improving the transparency of a formed article has not been recognized, and a good idea needs to be used to obtain a formed article excellent in both of heat resistance and transparency.

In view of the above current situation, it is an object of the present invention to provide a liquid stabilizer that provides a formed article excellent in both of transparency and heat resistance when the liquid stabilizer is used in a chlorine-containing resin, and that is useful as a tin-free stabilizer. Also, it is an object of the present invention to provide a chlorine-containing resin composition using this stabilizer and a formed body using this stabilizer.

Solution to Problem

The present inventors have studied a wide range of stabilizers for a chlorine-containing resin, and have found that a liquid stabilizer comprising predetermined amounts of a zinc toluate and an overbased barium salt can result in a formed article satisfying both of a high level of transparency and heat resistance. Even if this stabilizer does not comprise a tin component, this stabilizer can exhibit transparency and heat resistance almost comparable with or higher than the transparency and heat resistance as in a case where a conventional tin stabilizer is used, and therefore particularly useful as a tin-free stabilizer. As described above, the present inventors have been found that the above problem can be solved successfully, and have accomplished the present invention.

In other words, the present invention is a liquid stabilizer for a chlorine-containing resin, comprising a zinc toluate and an overbased barium salt, wherein the content of the zinc toluate and the content of the overbased barium salt are 1 to 50% by mass and 50 to 99% by mass, respectively, based on a total amount of the zinc toluate and the overbased barium salt of 100% by mass.

The above zinc toluate is preferably zinc m-toluate.

In addition, the present invention is also a chlorine-containing resin composition, comprising the above liquid stabilizer for a chlorine-containing resin and a chlorine-containing resin, wherein the content of the liquid stabilizer as the total amount of the zinc toluate and the overbased barium salt is 0.1 to 10 parts by mass per 100 parts by mass of the chlorine-containing resin.

The above chlorine-containing resin composition preferably further comprises a plasticizer in an amount of greater than 0 parts by mass and 50 parts by mass or less per 100 parts by mass of the chlorine-containing resin. The plasticizer is preferably at least one selected from the group consisting of a phthalic acid ester, an adipic acid alkyl ester, a non-phthalic acid plasticizer and an epoxidized vegetable oil.

Furthermore, the present invention is also a formed body, prepared by using the above chlorine-containing resin composition.

The above formed body is preferably a transparent formed body.

In addition, the above formed body is preferably plate-shaped, film-shaped or sheet-shaped.

Advantageous Effects of Invention

A liquid stabilizer for a chlorine-containing resin of the present invention can provide a formed article excellent in both of transparency and heat resistance when the liquid stabilizer is used in a chlorine-containing resin, and can provide a formed article excellent in a wide range of physical properties resulted from chlorine-containing resin in an easy and simple manner without impairing the appearance. In addition, the obtained formed article can provide bright color tone due to a small degree of initial coloration of the formed article. Such a stabilizer can exhibit transparency and heat resistance almost comparable with or higher than the transparency and the heat resistance as in a case where a conventional tin stabilizer is used, and therefore particularly useful as a tin-free stabilizer.

BRIEF DESCRIPTION OF DRAWINGS

FIG. 1 shows the test pieces obtained by arranging, in a ordered manner, the test pieces subjected to the static heat resistance test (Geer oven) described below over time, and reading these test pieces by a scanner to computerize the these test pieces. In FIG. 1, (a) represents the sheet prepared by using a conventional tin stabilizer (specifically, the octyl tin stabilizer obtained in Comparative Example 1), (b) represents the sheet prepared by using a conventional Ba/Zn type stabilizer (specifically, the Ba/Zn type stabilizer obtained in Comparative Example 2), and (c) represents the sheet prepared by using the stabilizer of the present invention obtained in Example 2, wherein each of these sheet prepared has been subjected to the treatment illustrated in the static heat resistance test described below.

In FIG. 2, (a) to (c) represents the test pieces obtained by subjecting each of the sheets described above to the treatment illustrated in the transparency evaluation test described below.

DESCRIPTION OF EMBODIMENTS

Figure 2:
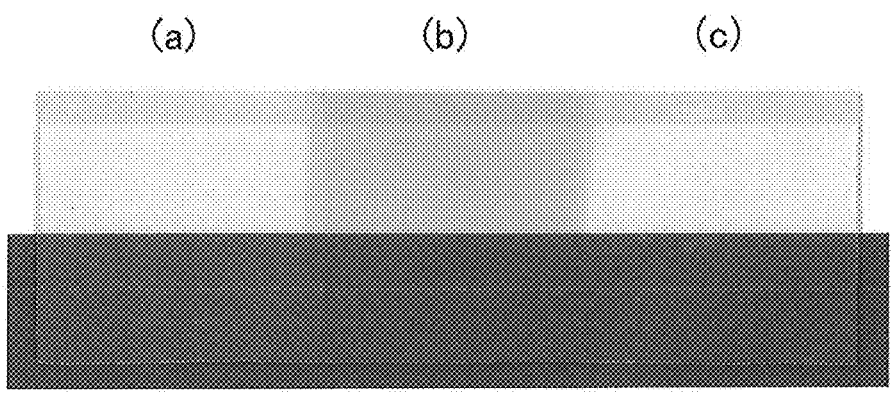
FIG. 2 shows the test pieces obtained by arranging, in a ordered manner, each of the test pieces obtained in the transparency evaluation test described below on a black paper, and taking the photographs of these test pieces to be read using a scanner to computerize the these test pieces.

In the following, preferable embodiments of the present invention will be specifically illustrated; however, the present invention is not limited to the following description, and can be changed and applied in an appropriate manner as long as the gist of the present invention is changed.

1. Liquid Stabilizer for Chlorine-Containing Resin

A liquid stabilizer for a chlorine-containing resin of the present invention (also merely referred to as "stabilizer") comprises a zinc toluate and an overbased barium salt. Where necessary, the liquid stabilizer for a chlorine-containing resin of the present invention can further comprise other components, each of these other components comprised in the stabilizer can be one kind of component, or can be two or more kinds of components.

Here, "liquid" means being liquid at any temperature of 0 to 35° C.

Zinc Toluate

As a zinc toluate, any of zinc o-toluate, zinc p-toluate and zinc m-toluate can be preferably used; however, zinc m-toluate (also referred to as zinc meta-toluate) is preferable in view of further increase in transparency.

Overbased Barium Salt

The overbased barium salt is not limited, and examples of the overbased barium salt include an overbased oleic acid barium salt, an overbased neodecanoic acid barium salt. Specific examples of preferable overbased barium salt include PlastiStab 2106, PlastiStab 2116, PlastiStab 2508, and PlastiStab 2513 manufactured by AM Stabilizers Corporation.

In the above stabilizer, the content of the zinc toluate and the content of the overbased barium salt are 1 to 50% by mass and 50 to 99% by mass, respectively, based on a total amount of the zinc toluate and the overbased barium salt of 100% by mass. As a result of this, using the stabilizer in the chlorine-containing resin can provide a formed article excellent in both of transparency and heat resistance. Preferably, the zinc toluate is 3 to 35% by mass and the overbased barium salt is 65 to 97% by mass, and more preferably, the zinc toluate is 5 to 25% by mass and the overbased barium salt is 75 to 95% by mass.

Phosphite Compound

The stabilizer of the present invention preferably further comprises a phosphite compound (also referred to as a phosphorous acid ester compound). As a result of this, a variety of physical properties in the formed article such as transparency, color tone and weather resistance are further improved.

The phosphite compound is not limited, and examples of the phosphite compound include triphenyl phosphite, tris(2,4-di-t-butylphenyl) phosphite, tris(nonylphenyl) phosphite, tris(dinonylphenyl) phosphite, tris(mono- and di-mixed nonylphenyl) phosphite, diphenyl acid phosphite, 2,2'-methylenebis(4,6-di-t-butylphenyl) octyl phosphite, diphenyldecyl phosphite, phenyl diisodecyl phosphite, tributyl phosphite, tri(2-ethylhexyl) phosphite, tridecyl phosphite, trilauryl phosphite, dibutyl acid phosphite, dilauryl acid phosphite, trilauryl trithiophosphite, bis(neopentylglycol).1,4-cyclohexanedimethyl diphosphite, bis(2,4-di-t-butylphenyl) pentaerythritol diphosphite, bis(2,6-di-t-butyl-4-methylphenyl) pentaerythritol diphosphite, distearyl pentaerythritol diphosphite, phenyl-4,4'-isopropylidene diphenol.pentaerythritol diphosphite, tetra($C_{12-15}$ mixed alkyl)-4,4'-isopropylidene diphenyl diphosphite, hydrogenated-4,4'-isopropylidene diphenol polyphosphite, bis(octylphenyl).bis[4,4'-n-butylidene bis(2-t-butyl-5-methylphenol)].1,6-hexanediol.diphosphite, tetratridecyl.4,4'-butylidene bis (2-t-butyl-5-methylphenol) diphosphite, hexa (tridecyl).1,1,3-tris(2-methyl-5-t-butyl-4-hydroxyphenyl) butane.triphosphite, and 9,10-dihydro-9-oxa-10-phospha phenanthrene-10-oxide.

When the above stabilizer comprises a phosphite compound, the content of the phosphite compound is not limited; however, the content of the phosphite compound is preferably, for example, 5 to 200 parts by mass based on a total amount of the zinc toluate and the overbased barium salt of 100 parts by mass. As a result of this, an effect resulted from the phosphite compound can be exhibited to a further extent. The content of the phosphite compound is more preferably 10 to 100 parts by mass, further preferably 20 to 60 mass parts by mass.

In addition, the stabilizer of the present invention can further include other components, where necessary. Examples of these other components include a dissolution agent (solvent), a plasticizer, a β-diketone compound, a lubricant, an antioxidant, an epoxy compound and a phosphate ester. Here, it is preferred that the proportion constituted by the zinc toluate, overbased barium salt and the phosphite compound is 50% by mass or more, more preferably 70% by mass or more based on a total amount of the stabilizer of 100% by mass.

2. Chlorine-Containing Resin Composition

The chlorine-containing resin composition of the present invention (also merely referred to as "resin composition") comprises a chlorine-containing resin and the above-described stabilizer of the present invention. Where necessary, the chlorine-containing resin composition of the present invention can further comprise other components, and each of the other components can be one kind of component, or can be two or more kinds of components.

Chlorine-Containing Resin

The chlorine-containing resin is not limited as long as the chlorine-containing resin is a resin (polymer) comprising a chlorine atom; however, the chlorine-containing resin is preferably vinyl chloride resin. As a result of this, the formed body excellent in flexibility and frame retardancy is obtained.

Examples of the vinyl chloride resin include homopolymers such as polyvinyl chloride, chlorinated polyvinyl chloride, polyvinylidene chloride and chlorinated polyethylene; and copolymers such as a vinyl chloride-vinyl acetate copolymer, a vinyl chloride-ethylene-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-urethane copolymer, a vinyl chloride-acrylic acid ester copolymer, a vinyl chloride-styrene-maleic anhydride copolymer, a vinyl chloride-styrene-acrylonitrile copolymer, a vinyl chloride-butadiene copolymer, a vinyl chloride-isoprene copolymer, a vinyl chloride-chlorinated propylene copolymer, a vinyl chloride-vinylidene chloride-vinyl acetate copolymer, a vinyl chloride-maleic acid ester copolymer, a vinyl chloride-methacrylic acid ester copolymer, a vinyl chloride-acrylonitrile copolymer, and a vinyl chloride-maleimide copolymer.

A blend of the chlorine-containing resin and a resin containing no chlorine can also be used, and in addition, the polymerization method for obtaining the vinyl chloride resin is not limited.

In addition, it is more preferred for the vinyl chloride resin to be a linear vinyl chloride resin than to be a vinyl chloride resin in the form of paste. As a result of this, the vinyl chloride resin is more preferable in an application where a transparency is required.

Stabilizer

The above resin composition includes the above-described stabilizer of the present invention. The content of the stabilizer of the present invention as the total amount of the zinc toluate and the overbased barium salt is 0.1 to 10 parts by mass per 100 parts by mass of the chlorine-containing resin. As a result of this, the heat resistance and the thermal stability are further improved. The above total amount is preferably 0.2 to 8 parts by mass, further preferably 0.3 to 5 parts by mass.

Plasticizer

The above resin composition further comprises a plasticizer, where necessary.

The plasticizer is not limited, and the plasticizer is, for example, preferably at least one selected from the group consisting of a phthalic acid ester, an adipic acid alkyl ester, a non-phthalic acid plasticizer and an epoxidized vegetable oil.

Examples of preferable phthalic acid ester include dibutyl phthalate, diheptyl phthalate, dioctyl phthalate (DOP), di-2-ethylhexyl terephthalate (DOTP), di-2-ethylhexyl isophthalate, diisooctyl phthalate, diisononyl phthalate (DINP), dioctyl decyl phthalate, diisodecyl phthalate, and butyl benzyl phthalate.

Examples of preferable adipic acid alkyl esters include di-2-ethylhexyl adipate, dioctyl adipate, didecyl adipate, and dibutyl diglycol adipate.

The non-phthalic acid plasticizer is not limited as long as it is a compound not having a phthalic acid ester backbone; and for example, the non-phthalic acid plasticizer is preferably an aliphatic cyclic ester compound, and among aliphatic cyclic ester compounds, an alkyl ester of dicarboxylic acid having an aliphatic ring is preferable. The alkyl group of this alkyl ester of dicarboxylic acid preferably has 1 to 20 carbon atoms. Specific examples of this alkyl ester of dicarboxylic acid include 1,2-cyclohexanedicarboxylic acid diisononyl ester.

Examples of the epoxidized vegetable oil include epoxidized soy oils, epoxidized linseed oils and epoxidized castor oils. Among these, epoxidized soy oils are preferable.

The content of the above plasticizer is not limited, and for example, the content of the above plasticizer is preferably 0 to 50 parts by mass per 100 parts by mass of the chlorine-containing resin. When the content of the plasticizer is 0 parts by mass, the above resin composition does not comprise any plasticizer. When the above resin composition comprises a plasticizer, the content of the plasticizer is preferably greater than 0 parts by mass and 50 parts by mass or less. In a more preferable manner, the content of the plasticizer is preferably 5 to 50 parts by mass. In the present invention, an embodiment in which the above resin composition does not comprise a plasticizer is also preferable.

Here, it is known that, as a general rule, the transparency and the initial colorability decreases depending on the decrease in the content of the plasticizer in the resin composition. However, for the present invention, in contrast to such common technical knowledge, the resin composition can exhibit a high level of transparency and initial colorability, even if the content of the plasticizer is in a small amount described above, or the resin composition does not comprise the plasticizer.

Other Component

In addition, the above resin composition can comprise other components, where necessary. Examples of these other components include a wide range of additives such as a reinforcing agent, a processing aid (preferably acrylic processing aid), a filler, a β-diketone compound, a heat resistance aid, a wax, a lubricant, an ultraviolet absorber, an antioxidant, a cross-linking aid and pigment. As these other components, it is possible to use components typically used in an application of a formed body of a chlorine-containing resin.

The method for obtaining the above resin composition is not limited, and can be accomplished by mixing a chlorine-containing resin, a stabilizer and an optional component used as necessary. The mixing method is not limited, and for example, it is preferable that, after the mixing by a Henschel mixer or a super mixer, the obtained mixture is homogenously kneaded by rolls, a Bumbary mixer, an extruder and the like.

The above resin composition can satisfy both of high transparency and high heat resistance, and in addition, can provide a formed article excellent in a wide range of physical properties resulted from the chlorine-containing resin without impairing the appearance. For this reason, the above resin composition is particularly useful in an application of a formed body.

3. Formed Body

The formed body of the present invention comprises the above-described chlorine-containing resin composition of the present invention. In other words, the formed body of the present invention is a formed body of the above chlorine-containing resin composition. For this reason, the formed body of the present invention is particularly excellent in transparency. Therefore, the formed body of the present invention is preferably a transparent formed body.

The shape of the formed body is not limited, and examples of the shape of the formed body include planar shapes such as shapes of plate, sheet, film and membrane, and also include other shapes such as shapes of string, rod, pellet and tube. Among these, the formed body is preferably plate-shaped, film-shaped or sheet-shaped in view of handling and the like. Also, specific examples of preferable formed body specifically include a wide range of films, electrical wires, pipes and resin window frames.

Forming (also referred to as molding) method is not limited, and examples of the forming method include extrusion molding, injection molding, roll forming, dip molding and blow molding. The above formed body is preferably a formed body obtained by extrusion molding (extrusion-molded body). Extrusion molding (extrusion forming) is preferably conducted by using an extrusion former, and this method can provide a formed body excellent in a wide range of physical properties in an easy and simple manner having good operability and good yields.

The above formed body (in particular, plate-shaped, film-shaped or sheet-shaped formed body) preferably has a total luminous transmittance of 85% or more when the formed body has a thickness of 1 mm. More preferably, the above formed body has a total luminous transmittance of 90% or more. Also, the haze of the above formed body having a thickness of 1 mm is preferably 20% or less. More preferably 15% or less, further preferably 10% or less, particularly preferably 5% or less.

In the present description, the total luminous transmittance is a proportion of all of the lights transmitted through the formed body, and the haze is a proportion of the diffuse transmission lights in lights that undergoes total luminous transmission. Specifically, the haze value can be measured by the method illustrated in Examples described below, and by subtracting this haze value from 100%, the total luminous transmittance can be determined.

EXAMPLES

The following specific examples are provided in order to illustrate the present invention in detail; however, the present invention is not limited to these examples. The methods for measuring the properties are as follows.

1. Static Heat Resistance

Each of the sheets obtained in Examples and Comparative Examples were subjected to aging in a Geer oven at 200° C. for 80 minutes to evaluate the period of time required for the blackening of each of the sheet. The results are shown in Table 1. Also, the changes over time of the sheets of Comparative Example 1, Comparative Example 2 and Example 2 are shown as (a), (b) and (c) in FIG. 1, respectively.

2. Transparency (Haze)

Each of the sheets obtained in Examples and Comparative Examples was cut to be with a length of 50 mm×a width of 50 mm, and four pieces of the cut sheets were stacked and then pressed at 190° C. for 10 minutes by an electrically heating press machine (manufactured by Toyo Seiki Seisaku-sho, Ltd.) to fabricate a test piece having a thickness of 1 mm. This test piece was visually rated with regard to the transparency. The indicators of this rating were as follows: the tin stabilizer of Comparative Example 1 was defined as Good, the case of a slight haze was defined as Fair, and the case of haze was defined as Poor. The results are shown in Table 1. Also, the test pieces obtained from each of the sheets of Comparative Example 1, Comparative Example 2 and Example 2 are shown as (a), (b) and (c) in FIG. 2, respectively. The test pieces obtained from each of the sheets of Example 2 and Comparative Example 1 were also measured for the haze values using a measuring instrument (Haze Meter NDH 4000) manufactured by Nippon Denshoku Industries Co., Ltd. The results are shown in Table 1.

3. Initial Colorability

Each of the test pieces obtained in the above "2. Transparency" test was measured for the chromaticity was measured using a colorimeter (manufactured by Tokyo Denshoku Co, Ltd.). The degree of coloring was assessed according to the b value. Lower value of this numerical value means better initial colorability. The results are shown in Table 1.

Example 1

0.2 parts by mass of zinc meta-toluate (manufactured by Sakai Chemical Industry Co., Ltd.), 3.0 parts by mass of an overbased barium salt (manufactured by AM Stabilizers Corporation, PlastiStab 2513), and 1.0 parts by mass of diphenyldecyl phosphite (manufactured by Johoku Chemical Co., Ltd., JPM-311) were mixed, and in addition, 0.7 parts by mass of AF solvent No. 4 (manufactured by JX Energy Corporation) as a solvent and 0.1 parts by mass of DBM (manufactured by YUSHI-SEIHIN Co, Ltd.) as a β-diketone compound were added and then mixed to fabricate a liquid stabilizer. To 100 parts by mass of a polyvinyl chloride resin (manufactured by Shin Dai-ichi Vinyl Corporation, ZEST1000Z), 8 parts by mass of acrylic processing aid (manufactured by Kaneka Corporation, KaneAce (R) B-513) was added, and in addition, the liquid stabilizer describe above was added in the entire amount and then mixed to prepare a vinyl chloride resin composition. The vinyl chloride resin composition obtained as described, above was kneaded by test rolls at 180° C. for 5 minutes, and was formed into a sheet having a thickness of 400 μm. The obtained sheet was subjected to the above evaluation.

Examples 2 to 7, Comparative Example 1 to 6

Except for the fact that the formulation of the vinyl chloride resin composition was set to be as shown in Table 1, vinyl chloride resin compositions were prepared in the same manner as in Example 1, and each of the vinyl chloride resin compositions is molded into a sheet having a thickness of 400 μm.

In Table 1, dioctyl tin is a product manufactured by Sakai Chemical Industry Co., Ltd. (KS-273M).

late)) and 1 part by mass of an epoxidized soy oil (manufactured by Sakai Chemical Industry Co., Ltd., INBRAFLEX A-6) were added, and in addition, the liquid stabilizer described above was added in the entire amount and then mixed to prepare a vinyl chloride resin composition.

TABLE 1

|  |  |  | Example | | | | | | | Comparative Example | | | | | |
|---|---|---|---|---|---|---|---|---|---|---|---|---|---|---|---|
|  |  |  | 1 | 2 | 3 | 4 | 5 | 6 | 7 | 1 | 2 | 3 | 4 | 5 | 6 |
| Resin composition | Stabilizing agent | Dioctyl tin | — | — | — | — | — | — | — | 4.5 | — | — | — | — | — |
|  |  | Zinc meta-toluate | 0.2 | 0.4 | 0.7 | 0.4 | 0.4 | 0.4 | 0.4 | — | — | 0.4 | — | 0.02 | 1.6 |
|  |  | Zinc oleate | — | — | — | — | — | — | — | — | 0.4 | — | 0.4 | — | — |
|  |  | Overbased barium salt | 3.0 | 3.0 | 3.0 | 1.5 | 4.0 | 3.0 | 3.0 | — | — | — | 3.0 | 3.0 | 1.5 |
|  |  | Barium oleate | — | — | — | — | — | — | — | — | 1.5 | 1.5 | — | — | — |
|  |  | Diphenyldecyl phosphite | 1.0 | 1.0 | 1.0 | 1.0 | 1.0 | — | — | — | 1.0 | 1.0 | 1.0 | 1.0 | 1.0 |
|  |  | Diphenyltridecyl phosphite | — | — | — | — | — | 1.0 | — | — | — | — | — | — | — |
|  |  | Tristridecyl phosphite | — | — | — | — | — | — | 1.0 | — | — | — | — | — | — |
|  |  | AF solvent No. 4 | 0.7 | 0.7 | 0.7 | 0.7 | 0.7 | 0.7 | 0.7 | — | 0.7 | 0.7 | 0.7 | 0.7 | 0.7 |
|  |  | DBM | 0.1 | 0.1 | 0.1 | 0.1 | 0.1 | 0.1 | 0.1 | — | 0.1 | 0.1 | 0.1 | 0.1 | 0.1 |
|  | Polyvinyl chloride resin |  | 100 | 100 | 100 | 100 | 100 | 100 | 100 | 100 | 100 | 100 | 100 | 100 | 100 |
|  | B-513 |  | 8 | 8 | 8 | 8 | 8 | 8 | 8 | 8 | 8 | 8 | 8 | 8 | 8 |
| Physical properties | Static heat resistance (min) |  | 80 | 80 | 80 | 60 | 80< | 80 | 80 | 70 | 40 | 40 | 80 | 70 | 30 |
|  | Transparency |  | Good | Good | Good | Good | Good | Good | Good | Good | Poor | Poor | Fair | Fair | Good |
|  | Haze value (%) |  |  | 4.7% |  |  |  |  |  | 4.3% |  |  |  |  |  |
|  | Initial colorability (b value) |  | 12 | 11.2 | 10.1 | 10.5 | 12.1 | 11.5 | 11.9 | 11.8 | 24.6 | 20.1 | 19 | 19.7 | 12.2 |

Example 8

0.2 parts by mass of zinc meta-toluate (manufactured by Sakai Chemical Industry Co., Ltd.), 1.5 parts by mass of an overbased barium salt (manufactured by AM Stabilizers Corporation, PlastiStab 2513), and 1.0 parts by mass of diphenyldecyl phosphite (manufactured by Johoku Chemical Co., Ltd., JPM-311) were mixed, and in addition, 0.4 parts by mass of AF solvent No. 4 (manufactured by JX Energy Corporation) as a solvent, and 0.1 parts by mass of DBM (manufactured by YUSHI-SEIHIN Co, Ltd.) as a β-diketone compound were added and then mixed to fabricate a liquid stabilizer. To 100 parts by mass of a polyvinyl chloride resin (manufactured by Shin Dai-ichi Vinyl Corporation, ZEST1000Z), 40 parts by mass of a plasticizer (manufactured by J-PLUS Co., Ltd., DOP (dioctyl phtha- The vinyl chloride resin composition obtained as described above was kneaded by test rolls at 170° C. for 5 minutes, and was formed into a sheet having a thickness of 400 μm. The obtained sheet was subjected to the above evaluation.

Example 9, Comparative Examples 7 to 10

Vinyl chloride resin compositions were prepared in the same manner as in Example 8, except for the fact that the formulations of the vinyl chloride resin compositions are as shown in Table 2. Each of the vinyl chloride resin compositions was molded into a sheet having a thickness of 400 μm.

In Table 2, DINP (diisononyl phthalate) is a plasticizer manufactured by J-PLUS Co., Ltd.

TABLE 2

|  |  |  | Example | | Comparative Example | | | |
|---|---|---|---|---|---|---|---|---|
|  |  |  | 8 | 9 | 7 | 8 | 9 | 10 |
| Resin composition | Stabilizing agent | Dioctyl tin | — | — | 2.5 | — | — | — |
|  |  | Zinc meta-toluate | 0.2 | 0.2 | — | 0.2 | 0.2 | 0.2 |
|  |  | Overbased barium salt | 1.5 | 1.5 | — | — | — | — |
|  |  | Barium oleate | — | — | — | 0.7 | 1.5 | 0.7 |
|  |  | Diphenyldecyl phosphite | 1.0 | 1.0 | — | 1.0 | 1.0 | 1.0 |
|  |  | AF solvent No. 4 | 0.4 | 0.4 | — | 0.4 | 0.7 | 0.4 |
|  |  | DBM | 0.1 | 0.1 | — | 0.1 | 0.1 | 0.1 |
|  | Polyvinyl chloride resin |  | 100 | 100 | 100 | 100 | 100 | 100 |
|  | Plasticizer | DOP | 40 | — | 40 | 40 | 40 | — |
|  |  | DINP | — | 40 | — | — | — | 40 |
|  |  | Epoxidized soy oil | 1 | 1 | 1 | 1 | 1 | 1 |
| Physical properties | Static heat resistance (min) |  | 80 | 80 | 80 | 50 | 60 | 50 |
|  | Transparency |  | Good | Good | Good | Fair | Fair | Fair |
|  | Haze value (%) |  | 3.1% | 3.1% | 2.8% |  |  |  |
|  | Initial colorability (b value) |  | 9.6 | 9.5 | 9.2 | 15.8 | 19 | 15.3 |

The following facts were confirmed by the Examples and the Comparative Examples.

Examples 1 to 7 are examples employing liquid stabilizers of the present invention, containing a zinc toluate and an overbased barium salt, wherein the content of the zinc toluate and the content of the overbased barium salt are 1 to 50% by mass and 50 to 99% by mass, respectively, based on a total amount of the zinc toluate and the overbased barium salt of 100% by mass. In contrast, Comparative Example 1 is an example employing a conventional tin stabilizer. It has been found that the sheets obtained in Examples 1 to 7 have heat resistance and transparency comparable with or higher than the heat resistance and the transparency in Comparative Example 1, and in addition, are excellent in initial colorability (see Table 1, FIGS. 1 and 2). By contrast, in Comparative Example 2 employing conventional Ba/Zn type stabilizers, Comparative Examples 3 and 4 employing stabilizers not containing either of a zinc toluate or an overbased barium salt, and Comparative Examples 5 and 6 in which although a stabilizer contained a zinc toluate and an overbased barium salt, the content of each of the zinc toluate and the overbased barium salt is not in the above-described range defined in the present invention, the heat resistance and/or the transparency is poorer, and as compared with Examples 1 to 7 employing the liquid stabilizer of the present invention, a remarkable difference can be confirmed. In addition, the initial colorability is not good. Examples 8, 9 and Comparative Examples 7 to 10 are examples employing a plasticizer, and even in the examples employing a plasticizer, results similar to those described above were obtained (see Table 2). Example 8 and Comparative Examples 7 to 9 employed DOP as a plasticizer, and Example 9 and Comparative Example 10 employed DINP as a plasticizer.

Therefore, it has been found that a formed article excellent in both of transparency and heat resistance and having good initial colorability can be obtained even when the formed article is free of tin, only by using the liquid stabilizer containing a zinc toluate and an overbased barium salt, wherein the content of the zinc toluate and the content of the overbased barium salt are in the above respective ranges.

The invention claimed is:

1. A liquid stabilizer for a chlorine-containing resin, comprising
    a zinc m-toluate and an overbased barium salt,
    wherein a content of the zinc m-toluate and a content of the overbased barium salt are 1 to 35% by mass and 65 to 99% by mass, respectively, based on a total amount of the zinc m-toluate and the overbased barium salt, which is 100% by mass.

2. A chlorine-containing resin composition, comprising
    the liquid stabilizer for a chlorine-containing resin according to claim 1 and a chlorine-containing resin,
    wherein a content of the liquid stabilizer as the total amount of the zinc m-toluate and the overbased barium salt is from 0.1 to 10 parts by mass per 100 parts by mass of the chlorine-containing resin.

3. The chlorine-containing resin composition according to claim 2, further comprising
    a plasticizer in an amount of greater than 0 parts by mass and 50 parts by mass or less per 100 parts by mass of the chlorine-containing resin.

4. The chlorine-containing resin composition according to claim 3,
    wherein the plasticizer is at least one selected from the group consisting of a phthalic acid ester, an adipic acid alkyl ester, a non-phthalic acid plasticizer, and an epoxidized vegetable oil.

5. A formed body, prepared by using the chlorine-containing resin composition according to claim 2.

6. The formed body according to claim 5,
    wherein the formed body is a transparent formed body.

7. The formed body according to claim 5,
    wherein the formed body is plate shaped, film shaped, or sheet shaped.

\* \* \* \* \*